United States Patent
Roy et al.

(10) Patent No.: US 10,939,268 B1
(45) Date of Patent: Mar. 2, 2021

(54) META RSP INTERFACE PLATFORM FOR ESIM PROFILE DISTRIBUTION

(71) Applicant: T-Mobile USA, Inc., Bellevue, WA (US)

(72) Inventors: Tanmay Roy, Redmond, WA (US); Cristian Asandului, Snoqualmie, WA (US); Kyeong Hun An, Sammamish, WA (US); Phani Ramisetty, Sammamish, WA (US); Mathew George, Krikland, WA (US); Ryan King, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/571,010

(22) Filed: Sep. 13, 2019

(51) Int. Cl.
| | |
|---|---|
| *H04M 3/00* | (2006.01) |
| *H04W 4/50* | (2018.01) |
| *H04W 4/20* | (2018.01) |
| *H04M 1/725* | (2021.01) |
| *H04W 8/24* | (2009.01) |

(52) U.S. Cl.
CPC ......... *H04W 4/50* (2018.02); *H04M 1/72525* (2013.01); *H04W 4/20* (2013.01); *H04W 8/245* (2013.01)

(58) Field of Classification Search
CPC ......... H04M 3/42178; H04M 1/72525; H04W 8/20; H04W 8/186
See application file for complete search history.

(56) References Cited

U.S. PATENT DOCUMENTS

| | | | |
|---|---|---|---|
| 10,187,784 B1 | 1/2019 | Chen et al. | |
| 10,194,313 B1* | 1/2019 | Karimli | H04W 12/06 |
| 2016/0183081 A1 | 6/2016 | Cuadrado et al. | |
| 2016/0269891 A1 | 9/2016 | Chen et al. | |
| 2017/0156051 A1 | 6/2017 | Park et al. | |
| 2017/0164184 A1 | 6/2017 | Borse | |
| 2017/0289788 A1* | 10/2017 | Lalwaney | H04L 41/0803 |
| 2018/0294949 A1* | 10/2018 | Yang | H04W 12/1006 |

(Continued)

FOREIGN PATENT DOCUMENTS

WO    WO2019015793 A1 * 12/2017

OTHER PUBLICATIONS

U.S. Appl. No. 16/571,020, Non-Final Office Action dated Aug. 27, 2020, 24 pages.

*Primary Examiner* — Shantell L Heiber
(74) *Attorney, Agent, or Firm* — Han Santos, PLLC

(57) ABSTRACT

A user device may receive a list of remote SIM provisioning (RSP) platforms that are designated by a mobile network operator (MNO) to distribute eSIM profiles of a partner MNO of the MNO, in which the partner MNO provides telecommunication services in a geographical area. The user device may obtain one or more service features of individual RSP platforms in the list of RSP platforms from a meta RSP interface (MRI) platform when the user device is in the geographical area. Subsequently, the user device may determine a number of service parameters that are met by the one or more service features of the individual RSP platforms. In response to identifying a single RSP platform as meeting a highest number of service parameters, the user device may request a download of an eSIM profile from the single RSP platform to access the telecommunication services of the partner MNO.

20 Claims, 7 Drawing Sheets

(56) References Cited

U.S. PATENT DOCUMENTS

| | | | | |
|---|---|---|---|---|
| 2018/0376325 A1* | 12/2018 | Xu | ........................ | H04W 8/245 |
| 2019/0037335 A1* | 1/2019 | Steck | ..................... | H04W 8/205 |
| 2019/0053185 A1* | 2/2019 | Shah | ................... | H04W 60/005 |
| 2019/0140837 A1* | 5/2019 | Cheng | ................. | H04W 12/004 |

* cited by examiner

META RSP INTERFACE PLATFORM FOR ESIM PROFILE DISTRIBUTION

BACKGROUND

The use of Embedded Universal Integrated Circuit Cards (eUICCs), also referred to as Embedded Subscriber Identity Modules (eSIMs), is becoming increasingly prevalent in consumer and machine-to-machine (M2M) communication fields. Unlike a traditional UICC or SIM card that exists as a removable smart card that is transferrable between multiple devices, an eUICC is an integrated circuit that is not designed to be user removable, i.e., it is generally embedded with or soldered to other electronic components of a device.

An eUICC may be provisioned with one or more eSIM profiles, in which each eSIM profile contains a unique international mobile subscriber identity (IMSI) number that authenticates a subscriber to a mobile network operator (MNO). Other data that are stored in the eSIM profile may include carrier network information, security authentication information, a list of accessible network services, and/or so forth, that are specific to the MNO. The MNO may transfer an eSIM profile to the eUICC of a user device via an over-the-air (OTA) update. For example, the user device may be a consumer device. Consumer devices are network-capable devices that are generally marketed to individual consumers. For example, these devices may include a smartphone, a tablet computer, a smartwatch, a gaming console, and/or so forth.

MNOs generally use Remote SIM provisioning (RSP) platforms that are operated by third parties to provision the eSIM profiles to the eUICCs of user devices. In many instances, an RSP platform may be provided by an eSIM profile vendor that operates a GSM Association (GSMA)-certified data center. For example, the eSIM profile vendor may be an eUICC manufacturer (EUM), and thus is able to generate eSIM profiles for installation in the eUICCs.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
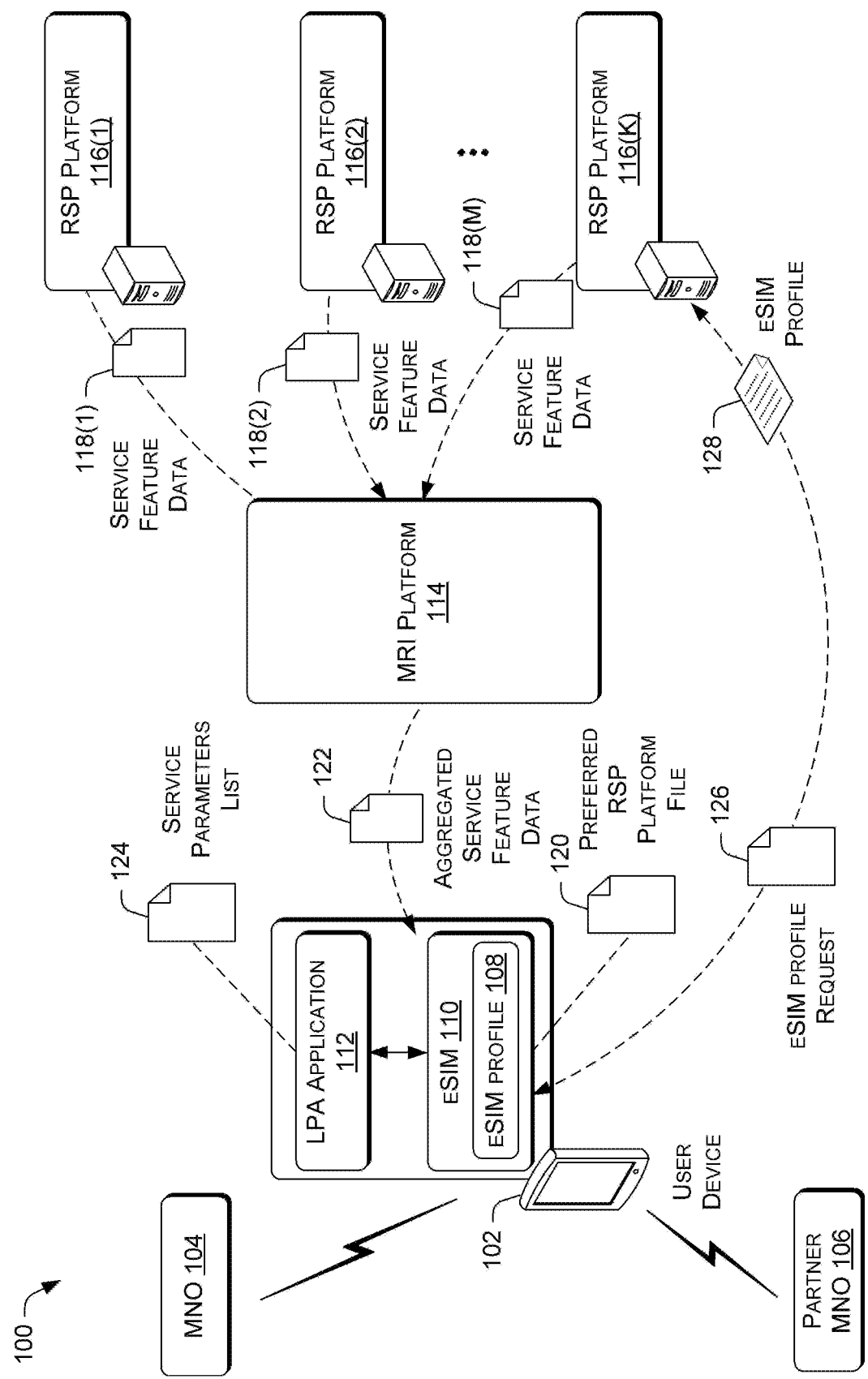
FIG. 1 illustrates an example architecture for a meta remote SIM provisioning (RSP) platform to distribute information on various RSP platforms to a user device such that the user device selects one of the RSP platforms as a provider of an eSIM profile.

This disclosure is directed to techniques for providing a meta RSP interface (MRI) platform that aggregates and stores data on the service features of multiple RSP platforms. The MRI may be operated by a consortium of RSP platforms. In some instances, the consortium may be a group of RSP platforms that are designated by an MNO to provide eSIM profiles to user devices serviced by the MNO. The service features of an RSP platform may include a geographical area serviced by the RSP platform, an availability of the RSP platform to distribute eSIM profiles, a representative response time of the RSP platform to requests for eSIM profiles, a reliability rating of the RSP platform in distributing eSIM profiles, available inventory quantities of eSIM profiles for different user device types that are carried by the RSP platform, and/or so forth.

Other service features of an RSP platform may include the ability of the RSP platform to provide prioritized provisioning of eSIM profiles to a selective group of user devices that belong to a particular organization, an ability for the RSP platform to service specialized eSIM profile management operations requested by the MNO or an organization serviced by the MNO (e.g., eSIM profile duplication, encryption, etc.), and an ability for the RSP platform to supply customized eSIM profiles (e.g., eSIM profiles that allow storage of additional client data within the profiles).

In various embodiments, a local profile assistant (LPA) application on a user device may have access to a list of preferred RSP platforms for a geographical area, so that the LPA application may download an eSIM profile of an MNO or a partner MNO from one of the RSP platforms when the user device is relocated to the geographical area. Accordingly, the eSIM profile as downloaded by the user device may enable the user device to obtain telecommunication services from a wireless carrier network operated by the MNO or the partner MNO. The list of preferred RSP platforms may be organized in an order of preference, e.g., from a most preferred RSP platform to a least preferred RSP platform. The LPA application of the user device may be further equipped with a list of predetermined service parameters for an ideal RSP platform. In some instances, an eSIM management platform of the MNO may distribute the list of preferred RSP platforms to the user device via a pull-model or a push-model. In various embodiments, the eSIM management platform is a backend service of the MNO that serves as an interface between the MNO and the RSP platforms.

Thus, when the user device relocates to the geographical area, the LPA application may request from the MRI platform the service features of the RSP platforms that are on the list of preferred RSP platforms. The LPA application then compares the service features of each RSP platform that are received from the MRI platform with the list of predetermined service parameters. For example, the service parameters may dictate minimal requirements for reliability, responsiveness, availability, functionality, etc. Based on the comparison, the LPA application may determine for each RSP platform the number of service parameters that are met by the service features of the RSP platform. In this way, the LPA application may identify one or more candidate RSP platforms that meet a highest number of service parameters. If only a single candidate RSP platform is able to meet the highest number of service parameters, the LPA application may select the single RSP platform as a provider RSP platform of the eSIM profile. Subsequently, the LPA application may obtain an eSIM profile for accessing the telecommunication services of the MNO or the partner MNO from the provider RSP platform.

However, when multiple candidate RSP platforms meet the highest number of service parameters, the LPA application may select one of the multiple RSP platforms that is indicated by the list of preferred RSP platforms as being the most preferred as a provider RSP platform of the eSIM profile. Alternatively, or concurrently, one or more of the predetermined service parameters may be designated as compulsive, such that a particular RSP platform must meet the one or more predetermined service parameters to be considered by the LPA application as a candidate RSP platform. Otherwise, the LPA application may reject the particular RSP platform regardless of the overall number of service parameters that are met by the particular RSP platform.

The use of the MRI platform that is able to distribute information regarding the service features of RSP platforms may provide an LPA application of a user device with the ability to autonomously select an RSP platform that best suits the eSIM profile operation needs of the user device. Nevertheless, the eSIM management platform of the MNO is able to maintain some degree of control over which RSP platforms are permitted to supply user devices with eSIM profiles via the distribution of RSP platform lists. Moreover, by offloading some of the data aggregation and data analysis regarding the most appropriate RSP platforms for distribution of eSIM profiles to the user devices and the MRI platform, the eSIM management platform may lessen its computation load and use its available computing resources to perform other eSIM profile operations. The techniques described herein may be implemented in a number of ways. Example implementations are provided below with reference to the following FIGS. 1-6.

Example Architecture

FIG. 1 illustrates an example architecture 100 for a meta remote SIM provisioning (RSP) platform to distribute information on service features of various RSP platforms to a user device such that the user device selects one of the RSP platforms as a provider of an eSIM profile. In various embodiments, the user device 102 may be a consumer device. Consumer devices are network-capable devices that are generally marketed to individual consumers. For example, these devices may include a smartphone, a tablet computer, a smartwatch, a gaming console, and/or so forth. The user device 102 may be capable of obtaining telecommunication and/or data communication services from the mobile network operator (MNO) 104. The MNO 104 may provide a wide range of mobile communication services, as well as ancillary services and features, to subscribers and associated mobile device users. In various embodiments, the MNO 104 may provide a wireless carrier network that serves multiple user devices. The wireless carrier network may also relay communications between the multiple user devices and user devices that are serviced by other telecommunications networks. The telecommunication services provided may include voice communication, multimedia communication, data communication, such as email, messaging, content streaming, content uploading, and/or so forth.

The wireless carrier network of the MNO 104 may be implemented using multiple interconnected networks. In various embodiments, the wireless carrier network may include multiple Radio Access Networks (RANs). The RANs may be connected to each other via regional ground networks. In turn, the regional ground networks may be connected to a core network by a wide area network (WAN). Each regional portion of the MNO 104 may include one or more RANs and a regional circuit and/or packet-switched network and associated signaling network facilities. The MNO 104 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the MNO 104 may be accessed via wired or wireless local area networks (LANs). For example, a wireless local area network may be a network that is established using Wi-Fi or Bluetooth standards and hardware. In various embodiments, the MNO 104 provides a home wireless carrier network to the user device 102. For example, the user device 102 may be registered with the MNO 104, and the wireless carrier network of the MNO 104 is the default provider of telecommunication services to the user device 102.

However, the user device 102 may from time to time obtain telecommunication service from other wireless carrier networks that are partner MNOs of the MNO 104, such as a partner MNO 106. The partner MNOs generally operate wireless carrier networks in geographical areas that are not served by the MNO 104. For example, the wireless carrier network provided by the MNO 104 may lack telecommunication network coverage in a particular geographical area. As a result, the MNO 104 may have one or more partner MNOs that do provide telecommunication network coverage in the particular geographical area. For example, the MNO 104 may operate a U.S. wireless carrier network, and a partner MNO of the MNO 104 may operate a European wireless carrier network. Nevertheless, in some instances, the MNO 104 and the partner MNOs may operate wireless carrier networks that have overlapping telecommunication network coverage.

The user device 102 may use an eSIM profile 108 that is stored in an embedded Subscriber Identity Module (eSIM) 110 of the user device 102 to authenticate to the MNO 104 in order to obtain telecommunication services from the MNO 104. For example, the eSIM profile 108 may contain a unique international mobile subscriber identity (IMSI) number that authenticates the user device 102 to the MNO 104. Other data that are stored in the eSIM profile may include carrier network information, security authentication information, a list of accessible network services, and/or so forth, that are specific to the MNO 104. An eSIM profile that designates a wireless carrier network of a particular MNO as a home carrier network is referred to as an MNO-specific eSIM profile of that particular MNO. Accordingly, the eSIM profile 108 is an MNO-specific eSIM profile of the MNO 104. Nevertheless, in most instances, the eSIM profile 108 is also configured to enable the user device 102 to roam on the wireless carrier networks of the partner MNOs.

In some embodiments, a local profile assistant (LPA) application 112 on the user device 102 may be configured to download a particular eSIM profile associated with a partner MNO, such as the partner MNO 106. In such embodiments, the download of the eSIM profile may occur when the user device 102 moves to a geographical area that is served by the wireless carrier network of the partner MNO and unserved by the wireless carrier network of the MNO 104. Accordingly, the particular eSIM profile may enable the user device 102 to obtain optimal network performance from the wireless carrier network provided by the partner MNO. In some instances, the use of the particular eSIM profile by the user device 102 may also enable a subscriber associated with the user device 102 to pay a discounted rate for the telecommunication services provided by the partner MNO. For example, the discounted rate may be less than a roaming rate that would be otherwise paid by the subscriber for having the user device 102 roam on the wireless carrier network of the partner MNO via the eSIM profile 108.

The user device 102 may download eSIM profiles associated with various MNOs from multiple RSP platforms. For example, an RSP platform may send one or more data packets that contain an eSIM profile to a modem of the user device 102 via an over-the-air (OTA) update. The data packets are assembled by the software of the modem into the eSIM profile and loaded into the eSIM 110 of the user device 102. In various embodiments, each of the multiple RSP platforms may be responsible for the management of eSIM profiles that are specific to one or more MNOs. Accordingly, each of the RSP platforms may include one or more subscription managers that are executed by one or more computing devices. In some embodiments, each of the RSP platforms may include at least one Subscription Manager Data Preparation (SM-DP), at least one Subscription Manager Data Preparation Plus (SM-DP+), and at least one Subscription Manager Secure Routing (SM-SR).

In various embodiments, the eSIM profiles for user devices, such as the user device 102, may be loaded into profile state stores of an SM-DP+ operated by an RSP platform. In some instances, each profile data store of the SM-DP+ may hold consumer eSIM profiles of a single MNO. In other instance, a single profile data store of an SM-DP+ may hold eSIM profiles of multiple different MNOs. Accordingly, each SM-DP+ is responsible for managing the eSIM profiles of a different MNO, or multiple SM-DP+s can collectively manage eSIM profiles of a single MNO. Thus, the SM-DP+s may distribute eSIM profiles to the user devices in response to requests from the user devices.

The MRI platform 114 may be operated by a consortium of RSP platforms. In some instances, the consortium may be a collective of RSP platforms that are designated by the MNO 104 to provide eSIM profiles to user devices that are registered with the MNO 104 in various geographical areas. For example, the group of RSP platforms 116(1)-116(K) may distribute eSIM profiles for the partner MNO 106 that serves a particular geographical area. Each of the eSIM profiles that are provided by the RSP platforms 116(1)-116(K) may include carrier network information, security authentication information, a list of accessible network services, and/or so forth, that are specific to the partner MNO 106. Likewise, the consortium may include other groups of RSP platforms that distribute eSIM profiles for MNOs that provide telecommunication network coverage in other geographical areas.

The MRI platform 114 may collect information on the service features of the RSP platforms in the consortium. The service features of an RSP platform may include a geographical area serviced by the RSP platform, an availability of the RSP platform to distribute eSIM profiles, a representative (e.g., average) response time of the RSP platform to requests for eSIM profiles, a reliability rating of the RSP platform in distributing eSIM profiles, available inventory quantities of eSIM profiles for different user device types that are carried by the RSP platform, and/or so forth. Other service features of an RSP platform may include the ability of the RSP platform to provide prioritized provisioning of eSIM profiles to a selective group of user devices that belong to a particular organization, an ability for the RSP platform to service specialized eSIM profile management operations requested by the MNO 104 or an organization serviced by the MNO 104 (e.g., eSIM profile duplication, encryption, etc.), and an ability for the RSP platform to supply customized eSIM profile (e.g., eSIM profiles that allow storage of additional client data within the profiles). For example, the MRI platform 114 may collect service feature data 118(1) from the RSP platform 116(1), service feature data 118(2) from the RSP platform 116(2), and service feature data 118(3) from the RSP platform 116(3). In turn, the MRI platform 114 may distribute the information on the service features of the RSP platforms 116(1)-116(K) to the LPA applications of the user devices.

In some embodiments, the eSIM 110 of the user device 102 may contain a preferred RSP platform file 120 that includes different lists of preferred RSP platforms for different geographical areas. In various embodiments, an eSIM management platform of the MNO 104 may distribute the preferred RSP platform file 120 to the user device 102 via a pull-model or a push-model. In the pull-model, the LPA application 112 is configured to periodically request an updated version of the preferred RSP platform file 120 from the eSIM management platform for storage in the eSIM 110. In the push-model, the eSIM management platform may periodically send the most updated version of the preferred RSP platform file 120 to the LPA application 112. In turn, the LPA application 112 may store the most updated version in the eSIM 110. Each list of preferred RSP platforms for a corresponding geographical area may be organized in an order of preference, e.g., from a most preferred RSP platform to a least preferred RSP platform. The user device 102 may initially access telecommunication services from the MNO 104 using the eSIM profile 108 that is specific to the MNO 104 while the user device 102 is located in a first geographical area. Subsequently, the LPA application 112 may detect that the user device 102 has moved to a second geographical area. The second geographical area may be an area that is not covered by the wireless carrier network of the MNO 104, but which is covered by the wireless carrier network of the partner MNO 106.

Following such detection, the LPA application 112 may retrieve a particular list of preferred RSP platforms that corresponds to the second geographical area from the preferred RSP platform file 120. The LPA application 112 may then request from the MRI platform 114 information on the service features of the RSP platforms that are on the particular list. In response, the MRI platform 114 may send the request information as aggregated service feature data 122 to the LPA application 112. The LPA application 112 compares the service features of each RSP platform that are received from the MRI platform 114 with a predetermined service parameters list 124. For example, the service parameters may dictate minimal requirements for reliability, responsiveness, availability, functionality, etc. that are set by the MNO 104 for the user device 102.

Based on the comparison, the LPA application 112 may determine for each RSP platform the number of service parameters that are met by the service features of the RSP platform. In this way, the LPA application 112 may identify one or more candidate RSP platforms that meet a highest number of service parameters. If only a single candidate RSP platform is able to meet the highest number of service parameters, the LPA application 112 may select the single RSP platform as a provider RSP platform of an eSIM profile to user device 102. Subsequently, the LPA application 112 may obtain an eSIM profile for using the telecommunication services of the partner MNO 106 from this provider RSP platform. For example, if the LPA application 112 selects the RSP platform 116(K) as the provider RSP platform, the LPA application 112 may send an eSIM profile request 126 to the RSP platform 116(K). In response, the RSP platform 116(K) may send an eSIM profile 128 that is specific for the partner MNO 106 to the user device 102 for storage in the eSIM 110. The eSIM profile 128 is then used by the user device 102 to access telecommunication services from the partner MNO 106 while the user device 102 is in the second geographical area. In some instances, there may be an error scenario in which the initial provider RSP platform is unable to distribute an eSIM profile to the user device 102 in a predetermined amount of time. In such an error scenario, the LPA application 112 may request the eSIM profile from an RSP platform that meets the next highest number of service parameters, and so on. In this way, the LPA application 112 may repeat such a procedure for any further error scenarios until the user device 102 is provisioned with an eSIM profile by an RSP platform.

However, when multiple candidate RSP platforms are identified by the LPA application 112 as meeting the highest number of service parameters, the LPA application 112 may determine which of these multiple candidate RSP platforms is indicated by the particular list of preferred RSP platforms as being the most preferred RSP platform. The most preferred RSP platform of these multiple candidate RSP platforms is then selected by the LPA application 112 as a provider RSP platform of the eSIM profile. Once again, if the LPA application 112 selects the RSP platform 116(K) as the provider RSP platform, the LPA application 112 may send an eSIM profile request 126 to the RSP platform 116(K). In response, the RSP platform 116(K) may distribute an eSIM profile 128 that is specific for the partner MNO 106 to the user device 102 for storage in the eSIM 110.

In some instances, there may be an error scenario in which the most preferred RSP platform that meets the highest number of service parameters is unable to distribute an eSIM profile to the user device 102 in a predetermined amount of time. In such an error scenario, the LPA application 112 may request the eSIM profile from an RSP platform that is the next most preferred RSP platform that meets the highest number of service parameters. If such an error scenario occurs with all of the RSP platforms that meet the highest number of service parameters, then the LPA application 112 may request the eSIM profile from an RSP platform that meets the next highest number of service parameters and is also most preferred on the particular list of preferred RSP platforms, and so on and so forth. In this way, the LPA application 112 may repeat such a procedure for any further error scenarios until the user device 102 is provisioned with an eSIM profile by an available RSP platform.

In alternative embodiments, one or more of the predetermined service parameters included in the service parameters list 124 may be designated as compulsive. This means that a particular RSP platform in a list of preferred RSP platforms must meet the one or more predetermined service parameters in order to be considered by the LPA application 112 as a candidate RSP platform. Otherwise, the LPA application 112 may reject the particular RSP platform as a candidate RSP platform regardless of the overall number of service parameters that are met by the particular RSP platform. In the case of such a rejection, the LPA application 112 may select an equivalently preferred or the next most preferred RSP platform that does meet every compulsive service parameter as the provider RSP platform.

In additional embodiments, the LPA application 112 may perform a simplified procedure for selecting a candidate RSP platform. In such embodiments, the user device 102 may initially access telecommunication services from the MNO 104 using the eSIM profile 108 that is specific to the MNO 104 while the user device 102 is located in a first geographical area. Subsequently, the LPA application 112 may detect that the user device 102 has moved to a second geographical area. The second geographical area may be an area that is not covered by the wireless carrier network of the MNO 104, but which is covered by the wireless carrier network of the partner MNO 106.

Following such detection, the LPA application 112 may request a list of available RSP platforms for the second geographical area from the MRI platform 114. Further, the LPA application 112 may retrieve a particular list of preferred RSP platforms that corresponds to the second geographical area from the preferred RSP platform file 120. Subsequently, the LPA application 112 may compare the list of available RSP platforms to the particular list of preferred RSP platform to determine an available RSP platform that is also designated as the most preferred RSP platform in the particular list of preferred RSP platforms. Accordingly, the LPA application 112 may obtain an eSIM profile from this available RSP platform. For example, if the RSP platform 116(K) is available and is the most preferred RSP platform, the LPA application 112 may send the eSIM profile request 126 to the RSP platform 116(K). In response, the RSP platform 116(K) may provide the eSIM profile 128 that is specific for the partner MNO 106 to the user device 102 for storage in the eSIM 110. The eSIM profile 128 is then used by the user device 102 to access telecommunication services from the partner MNO 106 while the user device 102 is in the second geographical area.

In some instances, there may be an error scenario in which the most preferred and available RSP platform is unable to distribute an eSIM profile to the user device 102 in a predetermined amount of time. In such an error scenario, the LPA application 112 may request the eSIM profile from another available RSP platform that is the next most preferred RSP platform designated in the particular list of preferred RSP platforms, and so on and so forth. In this way, the LPA application 112 may repeat such a procedure for any further error scenarios until the user device 102 is provisioned with an eSIM profile by an available RSP platform.

In the above embodiments, the LPA application 112 is described as making use of the Mill platform 114 when the user device 102 moves from a first geographical area that is served by the MNO 104 to a second geographical area that is unserved by the MNO 104 and served by the partner MNO 106. However, in other embodiments, the LPA application 112 may make use of the MRI platform 114 to obtain an eSIM profile in a similar manner when the user device 102 needs to initially request the eSIM profile to obtain telecommunication services from the MNO 104. In additional embodiments, the LPA application 112 may also make use of the MM platform 114 to obtain a new eSIM profile in a similar manner when the user device 102 moves between geographical areas that are served by wireless carrier networks that belong to different partner MNOs of the MNO 104.

Example MRI Platform

Figure 2:
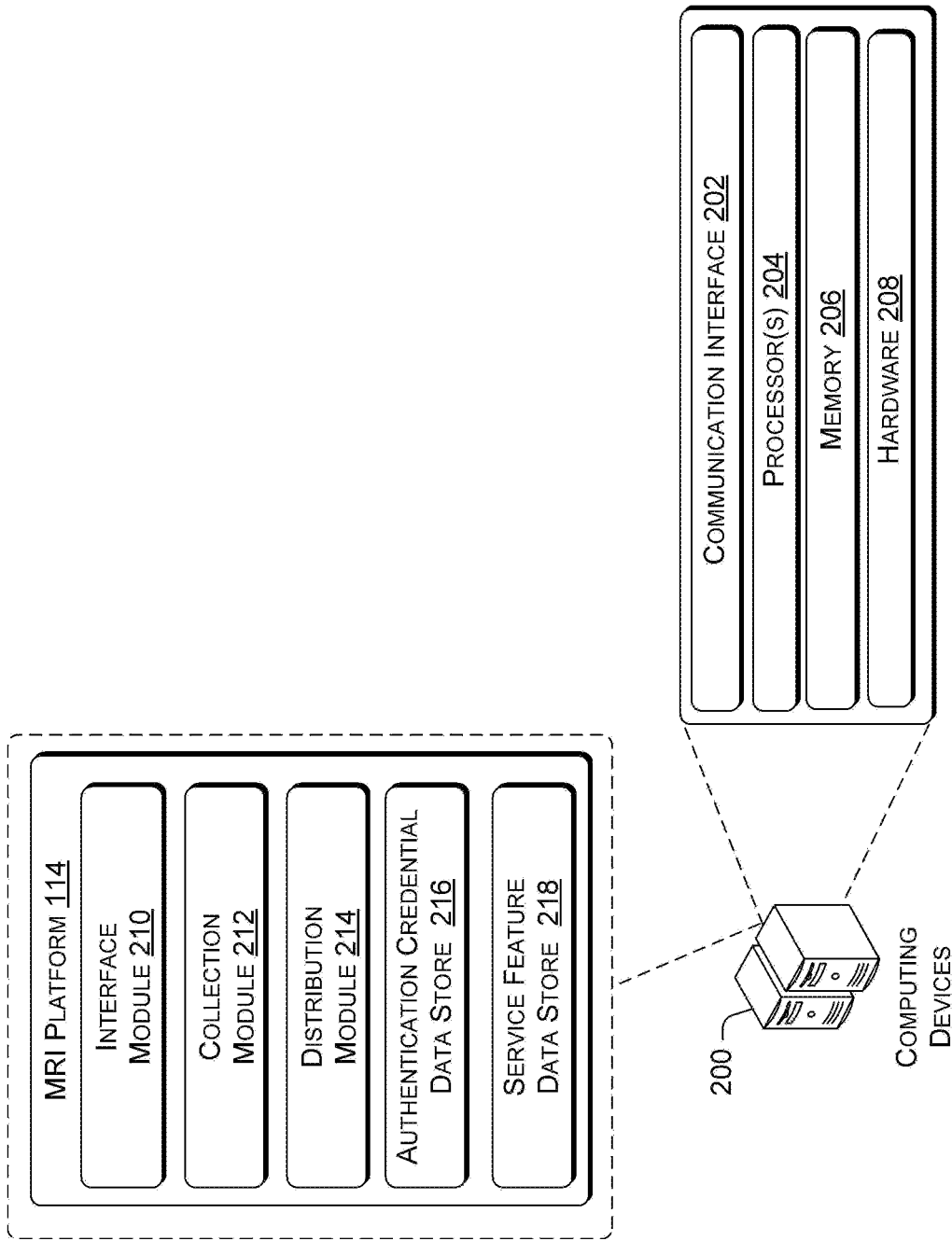
FIG. 2 is a block diagram showing various components of one or more illustrative computing devices that support the meta RSP platform.

FIG. 2 is a block diagram showing various components of one or more illustrative computing devices that support the MRI platform 114. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interfaces, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 200 or components thereof may be virtual computing devices in the form of virtual machines or software containers that are hosted in a computing cloud.

The computing devices 200 may implement the MRI platform 114. The implementation involves the execution of software, applications, and/or modules that include routines, program instructions, code segments, objects, and/or data structures that perform particular tasks or implement particular abstract data types. The Mill platform 114 may include an interface module 210, a collection module 212, and a distribution module 214.

The interface module 210 may enable the Mill platform 114 to communicate with RSP platforms, such as the RSP platforms 116(1)-116(K) via a standard protocol, such as the Hypertext Markup Language Protocol (HTTP) or the Hypertext Transfer Protocol Secure (HTTPS). In some instances, the interface module 210 may call one or more APIs of an RSP platform to download the service feature data for the RSP platform. Alternatively, or concurrently, the interface module 210 may include one or more APIs that are callable by an RSP platform that wants to provide its service feature data to the MRI platform 114. In some embodiments, the interface module 210 may include an authentication function that controls RSP platform access to the MRI platform 114. For example, an interface function of each RSP platform may submit a corresponding authentication credential to the interface module 210 when the RSP platform initially registers with the Mill platform 114. For example, the authentication credential may include an RSP identifier and a unique authentication token. The authentication credential of each RSP platform is stored by the MRI platform 114 in an authentication credential data store 216. Accordingly, the interface function of an RSP platform may submit an authentication credential in order to interface with the MRI platform 114. In turn, the MRI platform 114 may validate the submitted authentication credential against the stored authentication credential for the RSP platform to determine whether the RSP platform is to be granted interface access. In various embodiments, the computing devices of the MRI platform 114 and the RSP platforms may communicate via a network. The network may include a wireless carrier network, a local area network (LAN), a wide area network (WAN), and/or so forth.

The collection module 212 may store the received service feature data of the RSP platforms in a service feature data store 218. In various embodiments, the service feature data store 218 may include one or more databases, such as relational databases, object databases, object-relational databases, and/or key-value databases that store data. The service feature data for each RSP platform may be stored as related data entries in the one or more databases. Thus, as the interface module 210 receives updated service feature data from an RSP platform, the collection module 212 may update one or more data entries in the databases with the most recent information. In some embodiments, the collection module 212 may periodically activate the interface module 210 to poll servers of the RSP platforms for service feature data. In other embodiments, the servers of the RSP platform may periodically upload the service feature data to the MRI platform 114 via the interface module 210.

The distribution module 214 may receive requests from the LPA applications of user devices for service feature data of RSP platforms. For example, an LPA application may request service feature data of RSP platforms that appear in a list of preferred RSP platforms for a particular geographical area. The request from a particular LPA application may include information such as the identifiers of the RSP platforms, the corresponding geographical areas serviced by the RSP platforms, a timestamp for the initiation of the request, and/or so. In turn, the distribution module 214 may retrieve the requested information of the RSP platforms from the service feature data store 218, aggregate the information into aggregated service feature data, and send the aggerate service feature data to the particular LPA application via the network. In some instances, one or more RSP platforms that are included in the request from the LPA application may be unavailable to provide the eSIM profile. Accordingly, the distribution module 214 may return no service feature data for these RSP platforms. Rather, the distribution module 214 may indicate to the LPA application that these RSP platforms are not available.

In some instances, the request from an LPA application may further include an authentication credential of the LPA application. In such instances, the distribution module 214 may validate the authentication credential included in the request against a pre-stored authentication credential of the LPA application in the authentication credential data store 216. Accordingly, if the authentication credentials match, the distribution module 214 may fulfill the request. However, if the authentication credentials do not match, the distribution module 214 may deny the request. In other embodiments, the distribution module 214 may instead receive a request for a list of RSP platforms in a geographical area that are available to provide eSIM profiles on behalf of the partner MNO. In turn, the distribution module 214 may return the list of one or more available RSP platforms to the LPA application via the network.

Example Computing Device Components

Figure 3:
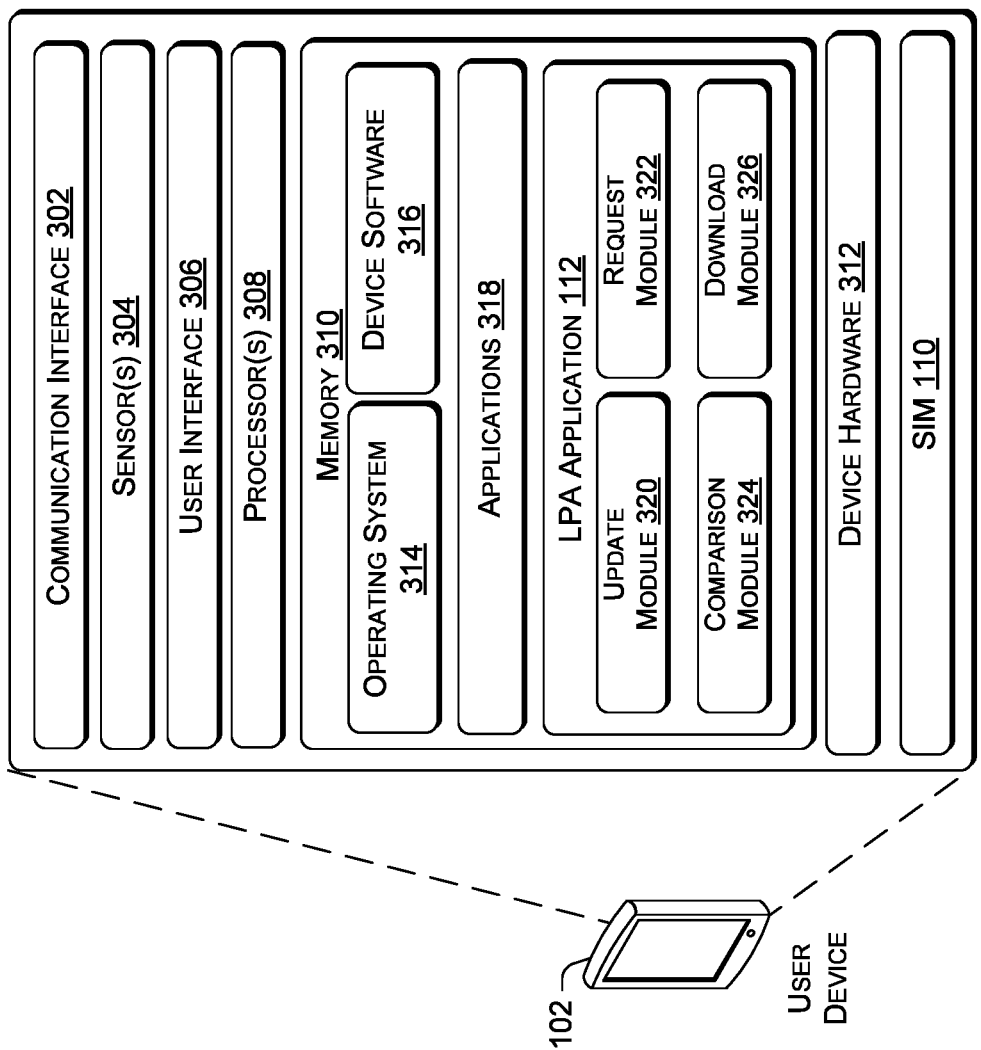
FIG. 3 is a block diagram showing various components of an illustrative user device that interfaces with the meta RSP platform.

FIG. 3 is a block diagram showing various components of an illustrative user device that interfaces with the meta RSP platform. The user device 102 may include a communication interface 302, one or more sensors 304, a user interface 306, one or more processors 308, memory 310, and device hardware 312. The communication interface 302 may include wireless and/or wired communication components that enable the electronic device to transmit or receive voice or data communication via the wireless carrier network, as well as other telecommunication and/or data communication networks. The sensors 304 may include a proximity sensor, a compass, an accelerometer, biometric sensors, cameras, and/or a global positioning system (GPS) sensor, among other appropriate sensors. The proximity sensor may detect the movement of objects that are proximate to the user device 102. The compass, the accelerometer, and the GPS sensor may detect orientation, movement, and geolocation of the user device 102. The cameras may capture images of the environment around the user device 102.

The user interface 306 may enable a user to provide inputs and receive outputs from the user device 102. The user interface 306 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 310 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 312 may include a cellular modem that enables the user device 102 to perform telecommunication and data communication with one or more wireless carrier networks, as well as a short-range transceiver that enables the device to connect to other devices via short-range wireless communication links. The device hardware 312 may further include signal converters, antennas, hardware decoders and encoders, graphics processors, and/or the like that enable the user device 102 to execute applications and provide telecommunication and data communication functions. The cellular modem may be driven by modem software to perform telecommunication and data communication with a wireless communication network. The modem software may be firmware that is stored in dedicated non-volatile memory of the user device 102. Such non-volatile memory may include read-only memory (ROM), erasable programmable read-only memory (EPROM), or flash memory. The user device is further equipped with the eSIM 110 that stores one or more eSIM profiles.

The one or more processors 308 and the memory 310 of the user device 102 may implement an operating system 314, device software 316, one or more applications 318, and the LPA application 112. Such software may include routines, program instructions, objects, and/or data structures that are executed by the processors 308 to perform particular tasks or implement particular abstract data types.

The operating system 314 may include components that enable the user device 102 to receive and transmit data via various interfaces (e.g., user controls, communication interface 302, and/or memory input/output devices). The operating system 314 may also process data using the one or more processors 308 to generate outputs based on inputs that are received via the user interface 306. For example, the operating system 314 may provide an execution environment for the execution of the applications 318. The operating system 314 may include a presentation component that presents the output (e.g., display the data on an electronic display, store the data in memory, transmit the data to another electronic device, etc.).

The operating system 314 may include an interface layer that enables applications to interface with the modem and/or the communication interface 302. The interface layer may comprise public APIs, private APIs, or a combination of both public APIs and private APIs. Additionally, the operating system 314 may include other components that perform various other functions generally associated with an operating system. The device software 316 may include software components that enable the user device to perform functions. For example, the device software 316 may include basic input/output system (BIOS), bootrom, or a bootloader that boots up the user device 102 and executes the operating system 314 following power-up of the device.

The applications 318 may include applications that provide utility, entertainment, and/or productivity functionalities to a user of the user device 102. For example, the applications 318 may include telephony applications, electronic mail applications, remote desktop applications, web browser applications, navigation applications, office productivity applications, multimedia streaming applications, an online shopping application, and/or so forth.

The LPA application 112 may include a platform update module 320, a request module 322, a comparison module 324, and a download module 326. Such modules may include routines, program instructions, objects, and/or data structures that are executed by the processors 204 to perform particular tasks or implement particular abstract data types. The LPA application 112 may communicate with one or more computing devices of the MRI platform via a network. The network may include a wireless carrier network, a local area network (LAN), a wide area network (WAN), and/or so forth.

The platform update module 320 may obtain preferred RSP platform files, such as the preferred RSP platform file 120, from an eSIM management platform of the MNO 104 via a pull-model or a push-model. In the pull-model, the platform update module 320 may periodically request an updated version of the preferred RSP platform file 120 from the eSIM management platform for storage in the eSIM 110. In the push-model, the eSIM management platform may periodically send the most updated version of the preferred RSP platform file 120 to the platform update module 320. In turn, the platform update module 320 may store the most updated version in the eSIM 110.

The request module 322 may request information on the service features of one or more particular RSP platforms that serve a geographical area from the MRI platform 114. In some embodiments, the request module 322 may initiate a request when the user device 102 determines via geolocation data that the user device 102 has moved to a new geographical area. However, in other embodiments, the request module 322 may initiate the request when the user device 102 initially powers up while located in a geographical area. The particular RSP platforms may be platforms that are designated as preferred RSP platforms by a list of preferred RSP platforms that corresponds to the geographical area. In response to a request, the MRI platform 114 may send the information as aggregated service feature data to the request module 322. The service features of an RSP platform may include a geographical area serviced by the RSP platform, an availability of the RSP platform to distribute eSIM profiles, a representative response time of the RSP platform to requests for eSIM profiles, a reliability rating of the RSP platform in distributing eSIM profiles, available inventory quantities of eSIM profiles for different user device types that are carried by the RSP platform, and/or so forth.

The availability of the RSP platform may be measured via a ratio of a numbers of times that the RSP platform responded to eSIM profile requests within a predetermined time limit to a number of times that the RSP platform responded to eSIM profile requests outside of the predetermined time limit. The RSP platform is considered to have responded to an eSIM request when the RSP platform provides an eSIM profile to a user device in response to the request. Such a ratio may be computed for a predetermined time period. The predetermined time period may be an active lifetime of the RSP platform, a periodic time interval (first quarter, second quarter, etc.), or a moving window of time (e.g., the most recent 60 days). The representative response time (e.g., 600 milliseconds) of the RSP platform may be a mean, median, or mode of the response times of the RSP platform in a given time period. The given time period may be an active lifetime of the RSP platform, a periodic time interval (first quarter, second quarter, etc.), or a moving window of time (e.g., the most recent 60 days).

The reliability of RSP platform may be measured by a percentage of times that the RSP platform responded to eSIM profile requests within a maximum timeout limit during a specific time period. The failure of the RSP platform to respond to the SIM profile request within the maximum timeout limit is considered to be a failure to respond. The specific time period may be an active lifetime of the RSP platform, a periodic time interval (first quarter, second quarter, etc.), or a moving window of time (e.g., the most recent 60 days). In alternative embodiments, the reliability of the RSP platform may be measured by a number of times that the RSP platform responded to eSIM profile requests within a maximum timeout limit during a specific time period. An availability inventory quantity of eSIM profiles for a particular user device type may refer to the number of the eSIM profiles stored by an RSP platform that are available for distribution to user devices.

Other service features of an RSP platform may include the ability of the RSP platform to provide prioritized provisioning of eSIM profiles to a selective group of user devices that belong to a particular organization, an ability for the RSP platform to service specialized eSIM profile management operations requested by the MNO or an organization serviced by the MNO (e.g., eSIM profile duplication, encryption, etc.), an ability for the RSP platform to supply customized eSIM profiles (e.g., eSIM profiles that allow storage of additional client data within the profiles). In alternative embodiments, the request module 322 may be configured to simply request a list of RSP platforms in a geographical area that are available to provide eSIM profiles on behalf of the partner MNO. In turn, the MRI platform 114 may return the list of one or more available RSP platforms to the LPA application via the network.

The comparison module 324 may compare the received service feature data of each RSP platform to a service parameters list that is stored in the memory 310 of the user device 102, such as the service parameters list 124. For example, the service parameters may dictate minimal requirements for an availability of the RSP platform to distribute eSIM profiles, an average response time of the RSP platform to requests for eSIM profiles, a reliability rating of the RSP platform in distributing eSIM profiles, available inventory quantities of eSIM profiles for different user device types that are carried by the RSP platform, and/or so forth. The service parameters may also dictate whether an RSP platform must have the ability to provide prioritized provisioning of eSIM profiles to a selective group of user devices that belong to a particular organization, the ability for the RSP platform to service specialized eSIM profile management operations requested by the MNO or an organization serviced by the MNO (e.g., eSIM profile duplication, encryption, etc.), and the ability for the RSP platform to supply customized eSIM profile (e.g., eSIM profiles that allow storage of additional client data within the profiles). In some embodiments, the comparison module 324 may receive a single service parameters list from the eSIM management platform of the MNO 104, in which such a list is to be used regardless of geographical area. However, in other embodiments, the eSIM management platform of the MNO 104 may provide the comparison module 324 with multiple service parameters lists for use with respect to different geographical areas.

The comparison module 324 may compare the service features of an RSP platform to a service parameters list to determine whether the RSP platform qualifies as a candidate RSP platform for supplying an eSIM profile to the user device 102. During the comparison, the comparison module 324 may determine for each RSP platform the number of service parameters that are met by the service features of the RSP platform. In this way, the comparison module 324 may identify one or more candidate RSP platforms that meet a highest number of service parameters. If only a single candidate RSP platform is able to meet the highest number of service parameters, the comparison module 324 may select the single RSP platform as a provider RSP platform of the eSIM profile. However, when multiple candidate RSP platforms are meeting the highest number of service parameters, the comparison module 324 may select one of the multiple RSP platforms that is indicated by the list of preferred RSP platforms as being the most preferred as a provider RSP platform of the eSIM profile.

In some embodiments, one or more of the service parameters in the service parameters list may be designated as compulsive, such that a particular RSP platform must meet the one or more predetermined service parameters to be considered by the comparison module 324 as a candidate RSP platform. Otherwise, the comparison module 324 may reject the particular RSP platform as a candidate RSP platform regardless of the overall number of service parameters that are met by the particular RSP platform.

In alternative embodiments, the request module 322 may receive a list of one or more available RSP platforms in response to a request for RSP platforms in a geographical area that are able to provide eSIM profiles on behalf of a partner MNO. In such embodiments, the comparison module 324 may compare the list of one or more available RSP platforms to the list of preferred RSP platforms. In this way, the comparison module 324 may select an available RSP platform that is also the most preferred as the provider RSP platform.

The download module 326 may be configured to send an eSIM profile request to a provider RSP platform that is selected by the comparison module 324. The eSIM profile request may include a device identifier of the user device 102, an identifier of the eSIM 110, a network identifier of the MNO 104, i.e., home carrier network, geolocation information of the user device 102, a network identifier of the MNO for which the eSIM profile is being sought, and/or other identification information. In turn, the RSP platform may prepare and send an eSIM profile that is specific for the partner MNO 106 to the user device 102. Further, the RSP platform may activate a billing function of the partner MNO 106, such as an Online Charging System (OCS) or another equivalent core network component, to track the usage of telecommunication services by the user device 102. The tracked usage information is used by the billing function to bill a subscriber account established for the user device 102 or pass through the charges to a subscriber account that is associated with the user device 102 and established with the MNO 104.

The eSIM profile is stored by the download module 326 into the eSIM 110. The eSIM profile is then used by the user device 102 to access telecommunication services from the partner MNO 106. In some instances, the storage of the eSIM profile that is specific to partner MNO 106 (e.g., eSIM profile 128) into the eSIM 110 may include a replacement of an existing eSIM profile (e.g., eSIM profile 108 that is specific to the MNO 104) in the eSIM 110. However, in other instances, the eSIM profile that is specific to partner MNO 106 may be stored in the eSIM 110 along with an existing eSIM profile. In some embodiments, the download module 326 may send a notification to the comparison module 324 when the provider RSP platform is unable to provide the eSIM profile is a predetermined amount of time. In response to the notification, the comparison module 324 may select another candidate RSP platform as the provider RSP platform as specified with respect to the error scenarios described in FIG. 1.

Example Processes

Figure 4:
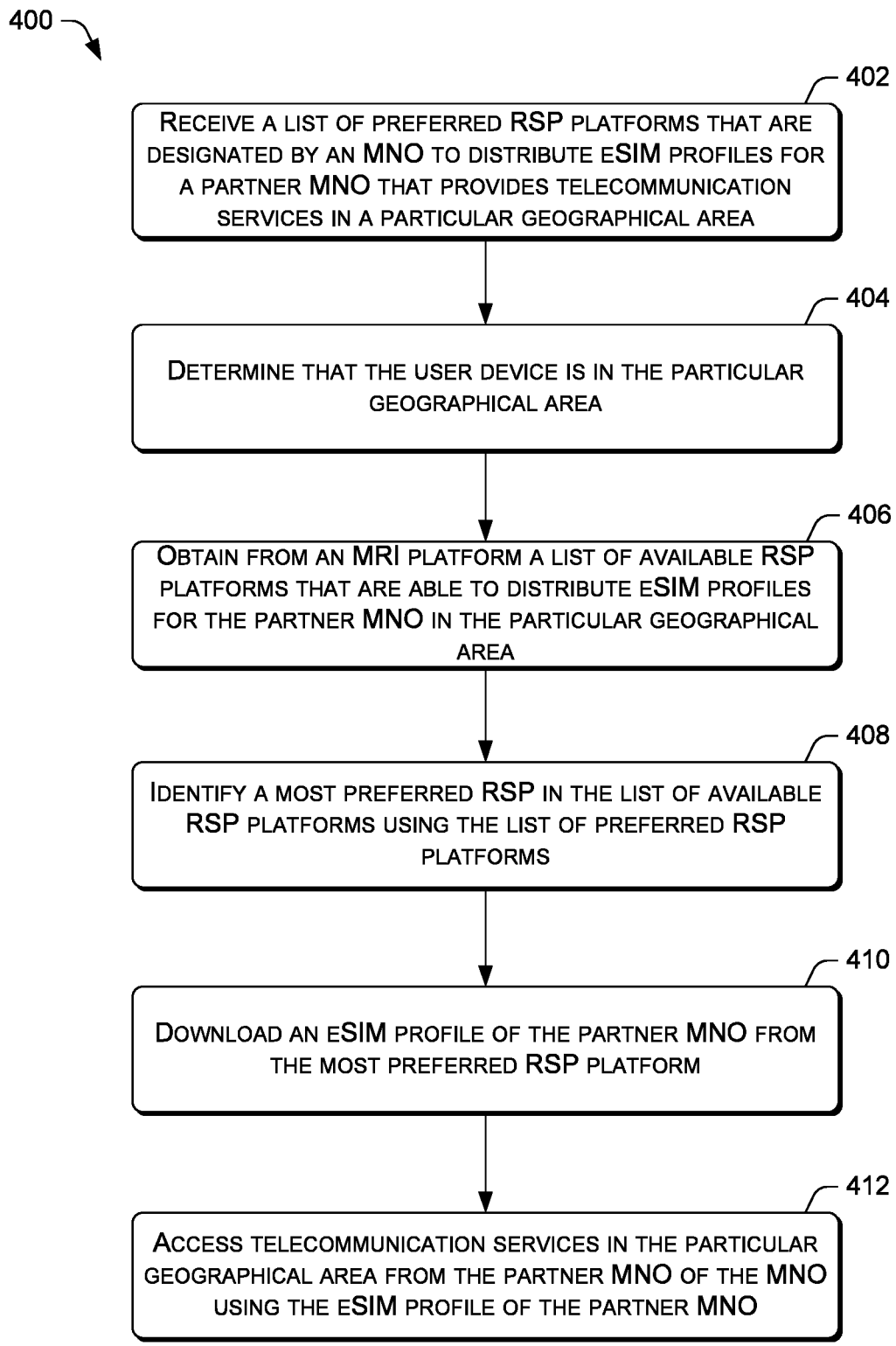
FIG. 4 is a flow diagram of an example process for using the meta RSP platform to identify a preferred RSP platform for downloading an eSIM profile of a partner mobile network operator (MNO).
Figure 5A:
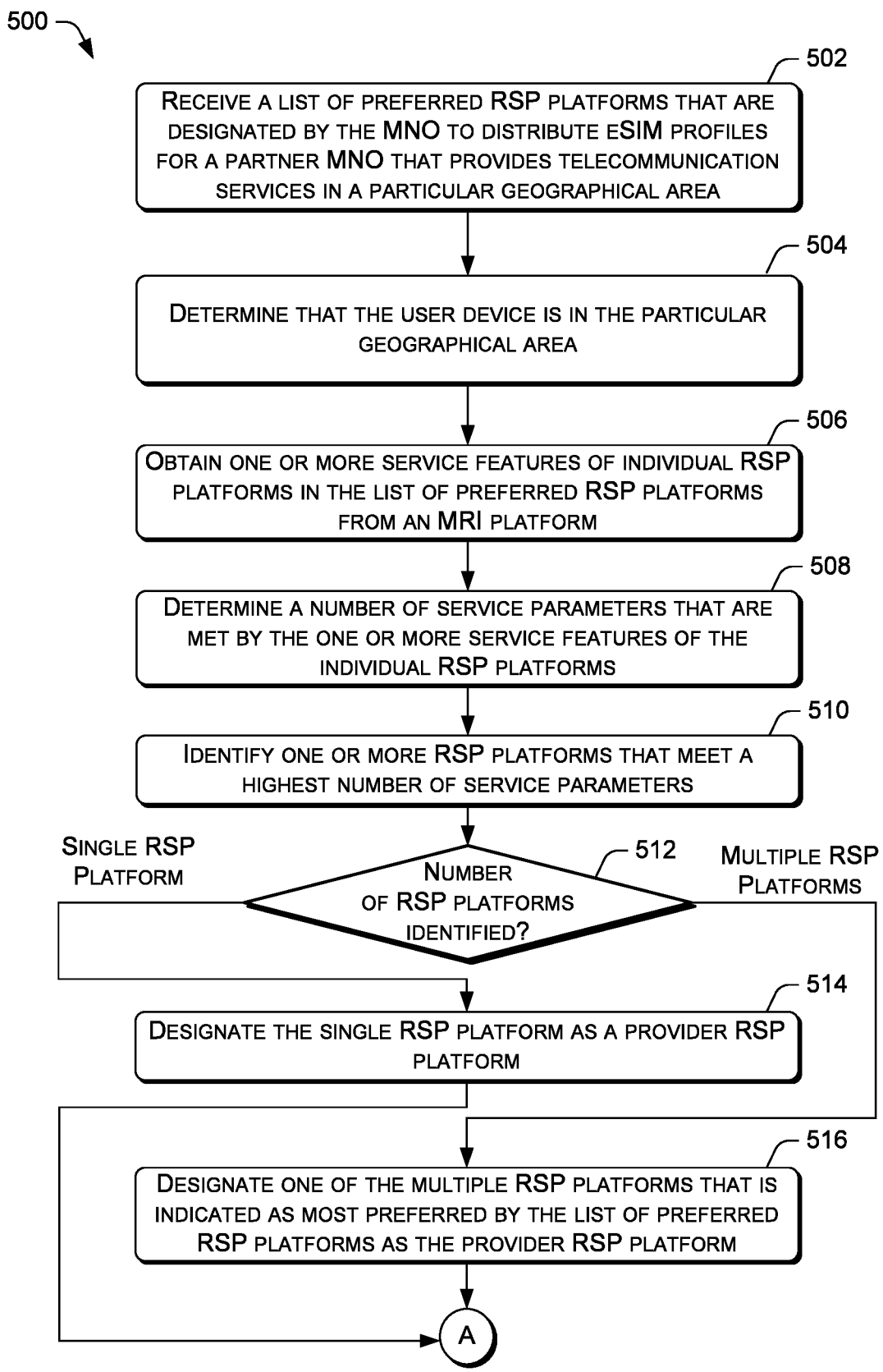
FIGS. 5a and 5b illustrate a flow diagram of an example process for using the meta RSP platform to identify an RSP platform for downloading an eSIM profile of a partner MNO based on the service features of multiple RSP platforms.
Figure 5B:
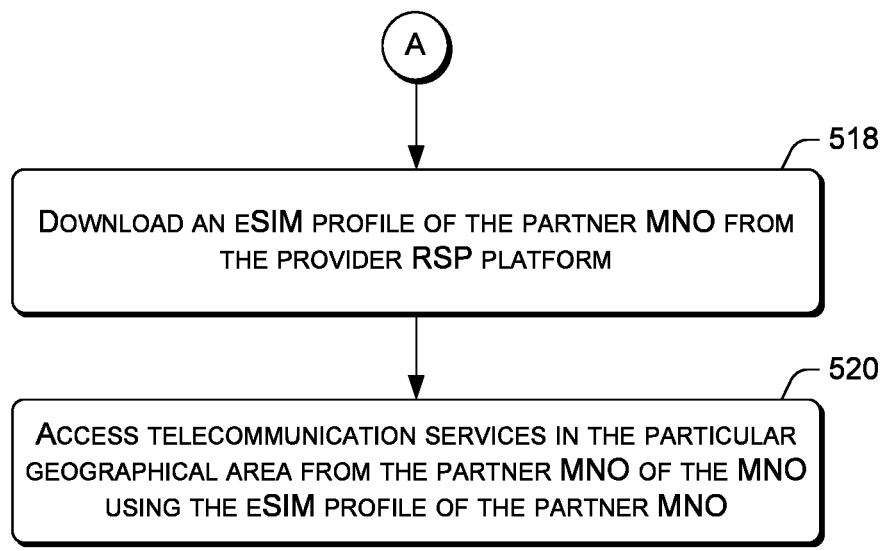
Figure 6:
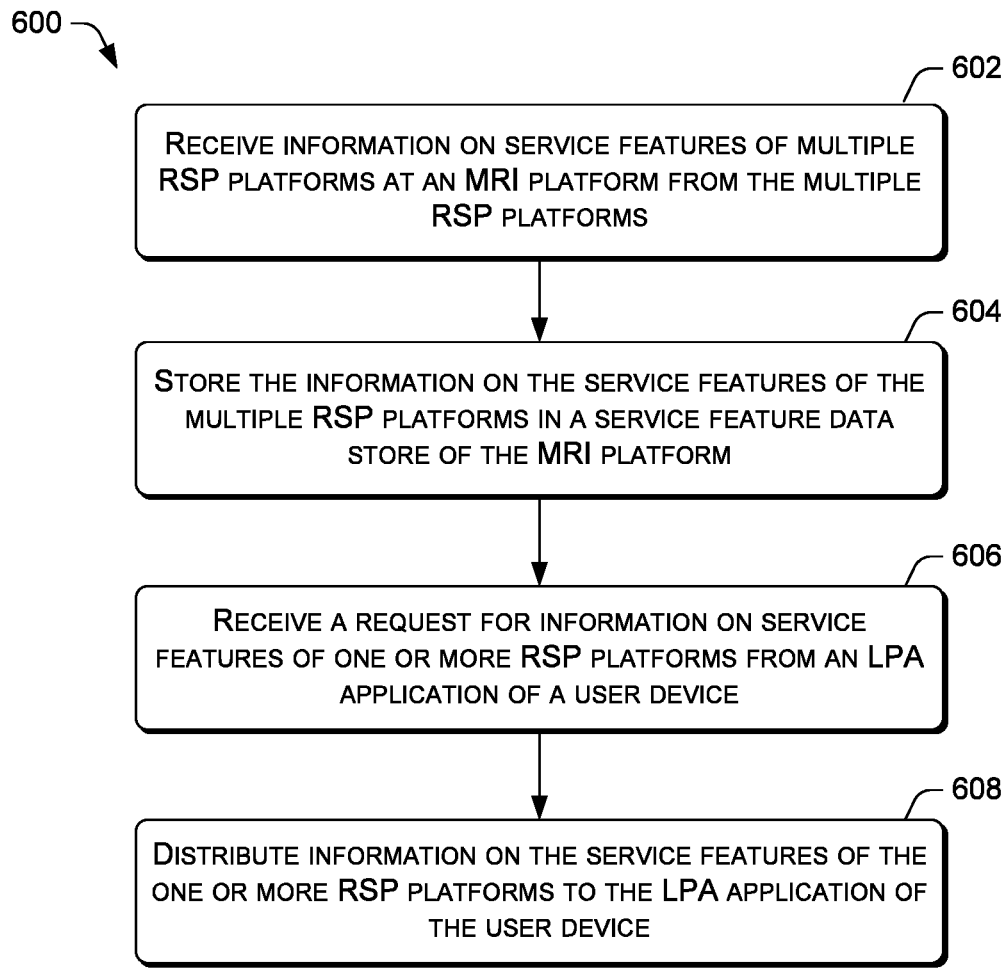
FIG. 6 is a flow diagram of an example process for distributing information on the service features of multiple RSP platforms to a local profile assistant (LPA) application.

FIGS. 4-6 present illustrative processes 400-600 for an MRI platform to distribute information regarding RSP platforms to the LPA applications of user devices, such that the user device selects one of the RSP platforms as a provider of an eSIM profile. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIG. 4 is a flow diagram of an example process 400 for using the meta RSP platform to identify a preferred RSP platform for downloading an eSIM profile of a partner mobile network operator (MNO). At block 402, the LPA application 112 on the user device 102 may receive a list of preferred RSP platforms that are designated by the MNO 104 to distribute eSIM profiles for a partner MNO that provides telecommunication services in a particular geographical area. In some instances, the user device 102 may receive the list of preferred RSP platforms while accessing the telecommunication services provided by the MNO 104 via the MNO-specific eSIM profile 108 stored in the eSIM 110 of the user device 102. For example, the user device 102 may be located in a current geographical area served by a wireless carrier network of the MNO 104. In other instances, the user device 102 may receive the list while using telecommunication services provided by an additional partner MNO of the MNO 104 using an eSIM profile that is specific to the additional partner MNO. For example, the user device 102 may be located in a current geographical area served by a wireless carrier network of the additional partner MNO. In various embodiments, the list of preferred RSP platforms may be provided by an RSP management function of the MNO 104. The list may be organized in an order of preference, e.g., from a most preferred RSP platform to a least preferred RSP platform.

At block 404, the LPA application 112 may determine that the user device 102 is in the particular geographical area. For example, the user device 102 may have moved from the current geographical area to the particular geographical area. In various embodiments, the LPA application 112 may make this determination based on geolocation data detected by a GPS sensor of the user device 102. At block 406, the LPA application 112 may obtain from the MRI platform 114 a list of available RSP platforms that are able to distribute eSIM profiles for the partner MNO in the particular geographical area. In response, the MRI platform 114 may return the list of available of RSP platforms in response to a request from the LPA application 112.

At block 408, the LPA application 112 may identify a most preferred RSP platform in the list of available RSP platforms using the list of preferred RSP platforms. In various embodiments, the LPA application 112 may compare the list of available RSP platforms and the list of preferred RSP platforms to identify the most preferred RSP platform.

At block 410, the LPA application 112 may download an eSIM profile of the partner MNO from the most preferred RSP platform. The download may include the LPA application 112 requesting the eSIM profile from the most preferred RSP platform. In turn, the most preferred RSP platform may send the eSIM profile to the user device 102. The downloaded eSIM profile may be stored by the LPA application 112 in the eSIM 110 of the user device 102. In some instances, the storage of the downloaded eSIM profile of the partner MNO may include replacing an existing eSIM profile stored in the eSIM 110 with the eSIM profile of the partner MNO. However, in other instances, the downloaded eSIM profile of the partner MNO may be stored along with the existing eSIM profile in the eSIM 110.

At block 412, the user device 102 may access telecommunication service in the particular geographical area from the partner MNO of the MNO using the eSIM profile specific to the partner MNO. The user device 102 is able to access a wireless carrier network of the partner MNO using the eSIM profile specific to the partner MNO.

FIGS. 5a and 5b illustrate a flow diagram of an example process 500 for using the meta RSP platform to identify an RSP platform for downloading an eSIM profile of a partner MNO based on the service features of multiple RSP platforms. At block 502, the LPA application 112 on the user device 102 may receive a list of preferred RSP platforms that are designated by the MNO 104 to distribute eSIM profiles for a partner MNO that provides telecommunication services in a particular geographical area. In some instances, the user device 102 may receive the list of preferred RSP platforms while accessing telecommunication services provided by the MNO 104 via the MNO-specific eSIM profile 108 stored in an eSIM 110 of the user device 102. For example, the user device 102 may be located in a current geographical area served by a wireless carrier network of the MNO 104. In other instances, the user device 102 may receive the list while accessing telecommunication services provided by an additional partner MNO of the MNO 104 via an eSIM profile that is specific to the additional partner MNO. For example, the user device 102 may be located in a current geographical area served by a wireless carrier network of the additional partner MNO. In various embodiments, the list of preferred RSP platforms may be provided by an RSP management function of the MNO 104. The list may be organized in an order of preference, e.g., from a most preferred RSP platform to a least preferred RSP platform.

At block 504, the LPA application 112 may determine that the user device 102 is in the particular geographical area. For example, the user device 102 may have moved from the current geographical area to the particular geographical area. In various embodiments, the LPA application 112 may make this determination based on geolocation data detected by a GPS sensor of the user device 102. At block 506, the LPA application 112 may obtain from the MRI platform 114 one or more service features of individual RSP platforms in the list of preferred RSP platforms. In some instances, the MRI platform 114 may determine that one or more RSP platforms in the list of preferred RSP platforms are no longer available to distribute eSIM profiles for the partner MNO. Accordingly, the LPA application 112 may return the one or more service features of individual RSP platforms that are available.

At block 508, the LPA application 112 may determine a number of service parameters that are met by the one or more service features of the individual platforms. In various embodiments, the service parameters may be retrieved by the LPA application 112 from a service parameter list that is stored in a memory of the user device 102.

At block 510, the LPA application 112 may identify one or more RSP platforms that meet a highest number of service parameters. Thus, if the LPA application 112 determines that there is only a single RSP platform with service features that meets the highest number of service parameters at decision block 512, the process 500 may proceed to block 514. At block 514, the LPA application 112 may designate the single RSP platform as a provider RSP platform. Subsequently, the process 500 may proceed directly to block 518. However, if at the decision block 512 the LPA application 112 determines that there multiple RSP platforms that meet the highest number of service parameters, the process 500 may proceed to block 516. At block 516, the LPA application 112 may designate one of the multiple RSP platforms that is indicated as most preferred by the list of preferred RSP platforms as the provider RSP platform. Subsequently, the process 500 may proceed to block 518.

At block 518, the LPA application 112 may download an eSIM profile of the partner MNO from the provider RSP platform. The download may include the LPA application 112 requesting the eSIM profile from the provider RSP platform. In turn, the provider RSP platform may send the eSIM profile to the user device 102. The downloaded eSIM profile may be stored by the LPA application 112 in the eSIM 110 of the user device 102. In some instances, the storage of the downloaded eSIM profile of the partner MNO may include replacing an existing eSIM profile stored in the eSIM 110 with the eSIM profile of the partner MNO. However, in other instances, the downloaded eSIM profile of the partner MNO may be stored along with the existing eSIM profile in the eSIM 110.

At block 520, the user device 102 may access telecommunication service in the particular geographical area from the partner MNO of the MNO using the eSIM profile of the partner MNO. The user device 102 is able to access a wireless carrier network of the partner MNO using the eSIM profile of the partner MNO.

FIG. 6 is a flow diagram of an example process 600 for distributing information on the service features of multiple RSP platforms to a local profile assistant (LPA) application. At block 602, the MRI platform 114 may receive information on service features of multiple RSP platforms. In some instances, the MRI platform 114 may call one or more APIs of an RSP platform to download the service feature data for the RSP platform. Alternatively, or concurrently, the MRI platform 114 may include one or more APIs that are callable by an RSP platform that wants to provide its service feature data to the MRI platform 114. At block 604, the MRI platform 114 may store the information on the service features of the multiple RSP platforms in a service feature data store of the MRI platform 114.

At block 606, the MRI platform 114 may receive a request for information on the service features of one or more RSP platforms from an LPA application of a user device. The request from the LPA application may include query parameters such as the identifiers of the RSP platforms, the corresponding geographical areas serviced by the RSP platforms, a timestamp for the initiation of the request, and/or so. In turn, the MRI platform 114 may retrieve the requested information of the one or more RSP platforms from the service feature data store. At block 608, the MRI platform 114 may send the requested information to the LPA application.

The use of the MRI platform that is able to distribute information regarding the service features of RSP platforms may provide an LPA application of a user device with the ability to autonomously select an RSP platform that best suits the eSIM profile operation needs of the user device. Nevertheless, the eSIM management platform of the MNO is able to maintain some degree of control over which RSP platforms are permitted to supply user devices with eSIM profiles via the distribution of RSP platform lists. Moreover, by offloading some of the data aggregation and data analysis regarding the most appropriate RSP platforms for distribution eSIM profiles to the user devices and the MRI platform, the eSIM management platform may lessen its computation load and use its available computing resources to perform other eSIM profile operations.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a user device storing computer-executable instructions that upon execution cause one or more processors to perform acts comprising:
receiving a list of remote SIM provisioning (RSP) platforms that are designated by a mobile network operator (MNO) to distribute eSIM profiles of a partner MNO of the MNO, the partner MNO providing telecommunication services in a geographical area via a wireless carrier network;
obtaining one or more service features of individual RSP platforms in the list of RSP platforms from a meta RSP interface (MRI) platform in response to determining that the user device is in the geographical area;
determining a number of service parameters set by the MNO for the user device that are met by the one or more service features of the individual RSP platforms; and
in response to identifying a single RSP platform of the individual RSP platforms as meeting a highest number of service parameters, requesting a download of an eSIM profile from the single RSP platform to access the telecommunication services from the wireless carrier network of the partner MNO.

2. The one or more non-transitory computer-readable media of claim 1, wherein the acts further comprise storing the eSIM profile received from the single RSP platform in an eSIM of the user device.

3. The one or more non-transitory computer-readable media of claim 1, wherein each of one or more compulsive service parameters included in the service parameters are met by a corresponding service feature included in one or more service features of the single RSP platform.

4. The one or more non-transitory computer-readable media of claim 1, wherein the acts further comprise requesting the download of the eSIM profile from an RSP platform that meets a next highest number of service parameters in response to the single RSP platform being unable to provide the eSIM profile in a predetermined period of time.

5. The one or more non-transitory computer-readable media of claim 1, wherein the determining that the user device is in the geographical area includes determining that the user device has moved from an additional geographical area to the geographical area, the additional geographical area being serviced by an additional wireless carrier network of the MNO or an additional partner MNO of the MNO.

6. The one or more non-transitory computer-readable media of claim 1, wherein the list of RSP platforms lists the individual RSP platforms according to an order of preference, further comprising:
in response to identifying multiple RSP platforms of the individual RSP platforms as meeting the highest number of service parameters, requesting a download of the eSIM profile from one of the multiple RSP platforms that is indicated as a most preferred RSP platform by the list to access the telecommunication services from the wireless carrier network of the MNO.

7. The one or more non-transitory computer-readable media of claim 6, wherein the acts further comprise storing the eSIM profile received from the most preferred RSP platform in an eSIM of the user device.

8. The one or more non-transitory computer-readable media of claim 6, wherein each of one or more compulsive service parameters included in the service parameters are met by a corresponding service feature included in one or more service features of the most preferred RSP platform.

9. The one or more non-transitory computer-readable media of claim 6, wherein the acts further comprise requesting the download of the eSIM profile from an RSP platform that is indicated as a next most preferred RSP platform by the list in response to the most preferred RSP platform being unable to provide the eSIM profile in a predetermined period of time.

10. The one or more non-transitory computer-readable media of claim 1, wherein a service feature of an RSP platform includes a geographical area serviced by the RSP platform, an availability of the RSP to distribute eSIM profiles, a representative response time of the RSP platform to requests for the eSIM profiles, a reliability of the RSP platform in distributing the eSIM profiles, or available inventory quantities of specific eSIM profiles for different types of user devices.

11. The one or more non-transitory computer-readable media of claim 3, wherein a service parameter includes a geographical location of the user device, an RSP platform availability requirement, an RSP platform response time requirement for an eSIM profile request, an RSP platform reliability requirement, or an RSP platform inventory requirement.

12. The one or more non-transitory computer-readable media of claim 1, wherein a service feature of an RSP platform or a service parameter associated with the user device includes an ability of the eSIM profile distributed by the RSP platform to hold user device data, an ability of the corresponding RSP platform to prioritize eSIM profile download to the user device, or an ability to update a third-party manager of the eSIM profile regarding an inventory status of eSIM profiles having the same type as the eSIM profile.

13. A user device, comprising:
one or more processors; and
memory including a plurality of computer-executable components that are executable by the one or more processors to perform a plurality of actions, the plurality of actions comprising:
receiving a list of preferred remote SIM provisioning (RSP) platforms that are designated by a mobile network operator (MNO) to distribute eSIM profiles of a partner MNO of the MNO, the partner MNO providing telecommunication services in a geographical area via a wireless carrier network;
obtaining from a meta RSP interface (MRI) platform a list of available RSP platforms that are able to distribute the eSIM profiles of the partner MNO in response to determining that the user device is in the geographical area;
identifying a most preferred RSP in the list of available of RSP platforms using the list of preferred RSP platforms; and
requesting a download of an eSIM profile from the most preferred RSP platform to access the telecommunication services from the wireless carrier network of the partner MNO.

14. The user device of claim 13, wherein the determining that the user device is in the geographical area includes determining that the user device has moved from an additional geographical area to the geographical area, the additional geographical area being serviced by an additional wireless carrier network of the MNO or an additional partner MNO of the MNO.

15. The user device of claim 13, wherein the plurality of actions further comprise storing the eSIM profile from the most preferred platform in an eSIM of the user device.

16. The user device of claim 13, wherein the plurality of actions further comprise, in response to the most preferred RSP platform being unable to provide the eSIM profile in a predetermined period of time:

identifying a next most preferred RSP in the list of available of RSP platforms using the list of preferred RSP platforms; and requesting the download of the eSIM profile from the next most preferred RSP platform to access the telecommunication services from the wireless carrier network of the partner MNO.

17. A computer-implemented method, comprising:

aggregating information on service features of multiple remote SIM provisioning (RSP) platforms at a meta RSP interface (MRI) platform;

storing the information on the service features the multiple RSP platforms in a service feature data store of the MRI platform;

receiving, at the MRI platform, a request for information on service features of individual RSP platforms in a list of RSP platforms from a local profile assistant (LPA) application of a user device; and distributing the information on the service features of the individual RSP platforms to the LPA application of the user device such that the LPA application selects an RSP platform from which to download an eSIM profile based on the service features, the eSIM profile providing the user device with access to telecommunication services of a mobile network operator (MNO).

18. The computer-implemented method of claim 17, wherein the receiving includes receiving the request from the LPA application following the user device relocating to a geographical area serviced by a wireless carrier network of the MNO from an additional geographical area serviced by an additional wireless carrier network of a different MNO.

19. The computer-implemented method of claim 17, wherein the service features of an RSP platform include a geographical area serviced by the RSP platform, an availability of the RSP to distribute eSIM profiles, a representative response time of the RSP platform to requests for the eSIM profiles, a reliability of the RSP platform in distributing the eSIM profiles, or available inventory quantities of specific eSIM profiles for different types of user devices.

20. The computer-implemented method of claim 19, wherein the service features of the RSP platform further include an ability of the eSIM profile distributed by the RSP platform to hold user device data, an ability of the corresponding RSP platform to prioritize eSIM profile download to the user device, or an ability to update a third-party manager of the eSIM profile regarding an inventory status of eSIM profiles having the same type as the eSIM profile.

* * * * *